Feb. 28, 1939.     J. R. T. CRAINE     2,149,086
ELECTRICAL CAPACITOR
Filed March 30, 1935

Inventor:
John R. T. Craine,
by Harry E. Dunham
His Attorney.

Patented Feb. 28, 1939

2,149,086

UNITED STATES PATENT OFFICE 2,149,086

ELECTRICAL CAPACITOR

John R. T. Craine, Pittsfield, Mass., assignor to General Electric Company, a corporation of New York Application March 30, 1935, Serial No. 13,880

6 Claims. (Cl. 175—315)

The present invention relates to electrolytic capacitance devices, including generically not only capacitors or condensers, but also devices having some of the characteristics of capacitors, such for example, as cables, and capacitance bushings.

It is the object of my invention to provide electrolytic capacitance devices of the so-called "dry type" which are long-lived and more stable in their electrical characteristics and which are less subject to physical deterioration upon being subjected to super-normal temperatures and to aging than similar devices heretofore produced.

One variety of electrolytic capacitance devices heretofore used has the spaces between the armatures filled with a porous material which is impregnated with a liquid composition comprising a polyhydric alcohol, such as glycol, or glycerine, and an ionogen such, for example, as boric acid. It has been found that such capacitors when subjected to aging even when idle tend to deteriorate by the settling and shrinking of the impregnating composition. The settling of this composition will cause an accumulation thereof near the bottom of the capacitor armatures, leaving unfilled spaces near the top. Also, the shrinking of such composition will cause voids to form in the capacitor, the composition cracking away from the armatures and drying out.

In accordance with my present invention this difficulty is largely overcome by employing an aqueous emulsion of a resinous material containing combined polyhydric alcohol as the carrier for an ionogen. Such emulsion has more body and has a higher viscosity and is stickier than the compositions which heretofore have been used for holding the electrolyte between the capacitor armatures, and, therefore, is not subject to the above-mentioned difficulties.

Figure 1:
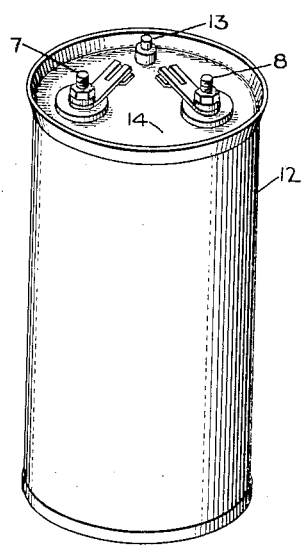
Figure 2:
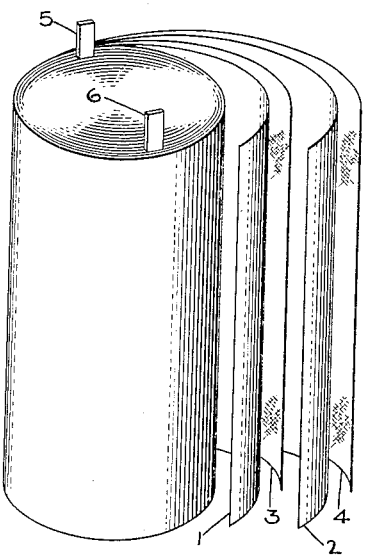
Figure 3:
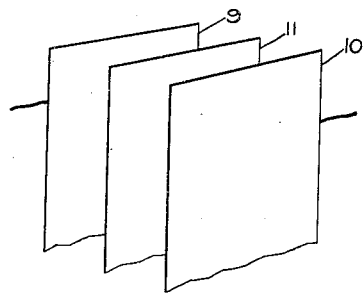

The accompanying drawing shows somewhat schematically electric capacitors to which my invention is applicable. In this drawing, Fig. 1 shows in external perspective a completed roll-type capacitor; Fig. 2 shows the internal elements partly unrolled; and Fig. 3 shows diagrammatically a stack-type capacitor.

In the roll-type capacitors elongated strip armatures or electrodes of suitable foil such as strips 1, 2 of aluminum, or other suitable film-forming metal, are rolled up on one another, the foils being separated by suitable separators or spacers 3, 4, which may consist of an open-meshed fabric, such as cheesecloth. The aluminum foil is pretreated by well-known electrolytic methods to form a current-blocking film thereon. Suitable outwardly projecting conductors 5, 6 are provided on the armatures 1, 2 for making contact with external terminals as shown at 7, 8 in Fig. 1. The armatures may be placed in proper juxtaposition without rolling, as shown in Fig. 3. In this figure, condenser armatures are placed close together in stack form (only two being shown at 9, 10) a spacer 11 being interposed.

In accordance with my present invention, the spaces in the separators 3, 4 are filled with the emulsion of a resinous material to which reference has been made above. I prefer to employ resins of the class made by the interaction of the polyhydric alcohol and the polybasic acid with or without modifying agents. Such resins generically are known as alkyd resins. While various forms of emulsifying agents may be employed, I prefer to employ as emulsifying agent an organic compound containing an amine group ($NH_2$, or substituted $NH_2$), such for example as triethanol-amine or aniline. The resinous emulsion should also contain a substantial quantity of water and a suitable ionogen, such as a weak acid or a compound of a weak acid. The ionogen in general should constitute about 2% of the total weight of the filling compound for the space between the capacitor armatures, although this figure is not to be taken as critical.

The following specific examples will further illustrate the nature of my invention:

A resin is prepared by heating to a resinification temperature (ordinarily within the limits of about 170 to 200° C.) the following mixture by weight: 465 parts of ethylene glycol, 208 parts of boric acid, 365 parts of adipic acid. The heating is continued only to a point at which the resin is formed in the A-stage and without any substantial polymerization to the B or C-stages.

The emulsification of the resulting resin with the other ingredients may be carried out by stirring the liquid resin into an aqueous solution of the amine, or other emulsifying agent, and the ammonium borate, boric acid, or other ionogen. For example, 10 parts of triethanol amine and 1 part of ammonium borate are dissolved in 20 parts of water. Into this solution while heated to about 90° C. are slowly stirred 25 parts of the fused resin prepared as above indicated. All parts given should be understood to be by weight. Stirring is continued until the resulting emulsified mass is cooled to room temperature. The resulting mixture in which the disperse phase is constituted of resin and the continuous phase of aqueous solution is of a soft paste-like consistency and may be spread on or impregnated in the spacer strips 3, 4. The spacer thus filled and coated with the emulsified mass is assembled by rolling as indicated in Fig. 2, or by stacking in proper relation, as shown in Fig. 3. In some cases the porous spacer may be omitted, the emulsion being spread directly on the metal face armatures.

The emulsion prepared in accordance with my invention is of a sticky character and does not readily separate from the capacitor armatures or settle down in the spaces in the lower part of the external container 12, in which the capacitor assembly is housed during use. The container 12 is provided with a breather vent 13, the cover 14 otherwise being tightly sealed.

In the preparation of the impregnating material it may be said that the amount of ionogen should be regulated to give the desired resistance, which in general is directly proportional to the power factor and inversely proportional to the capacity. In other words, the low resistance in a capacitor is desirable and in general it is accompanied by a high capacity characteristic, also is accompanied by a lower power factor which is a mixture of energy losses. Such capacitors are best suited for use in the low voltage field. The amount of water similarly will be determined by the use desired for the capacitors. In general, it may be said that the water content of the emulsion by weight should be between the limits of about 10 to 40%, and the content of the emulsifying agent between the limits of between 2 to 20%.

In place of the above described alkyd resin, other forms of such resin can be used as constituents for impregnating materials for capacitors. For example, the following mixture may be resinified by heating as above described, the parts given being by weight: 440 parts of glycerine, 200 parts of boric acid, 356 parts of phthalic anhydride. Such a mixture is emulsified by addition in the fused state to a solution in water of the emulsifying agent and the ionogen as above described. In place of the adipic acid and the phthalic anhydride of the above examples other resinifying acids may be used, as for example succinic acid, sebacic acid, and maleic anhydride. Also within the scope of my invention resin-like solids which are liquefiable at temperatures up to 125° C. and which are emulsifiable in water may be used, as for example asphalts and pitches.

In place of ammonium borate I may use other weak acids, such as tartaric and citric acid, or their salts, in general the ammonium salts being preferred. In some cases a hydroxy fatty acid, such as alpha hydroxy isobutyric acid, may be added in small amounts, say, one per cent or less, for the purpose of increasing ionization.

What I claim as new and desire to secure by Letters Patent of the United States is:

1. In a capacitor comprising film-forming armatures, an aqueous emulsion of an alkyd resin and an ionogen.

2. An electric capacitor comprising armatures of aluminum foil spaced closely adjacent to one another, a gel contained in the space between said armatures, said gel being an emulsion consisting preponderantly of an alkyd resin and containing a substantial proportion of water and an ionogen dispersed therein.

3. An electric capacitor comprising armatures of aluminum foil spaced closely adjacent to one another, a gel contained in the space between said armatures, said gel being an aqueous emulsion consisting preponderantly of an alkyd resin modified by combination with boric acid, said resin being emulsified with an amine compound and said gel having an ionogen dispersed therein.

4. A composition adapted for use in capacitors consisting mainly of an aqueous emulsion of an alkyd resin and a substantial proportion of an ionogen dispersed therein.

5. In an electric capacitor having film-forming armatures, an aqueous electrolyte consisting by weight of about 10 to 40 per cent water, about 2 to 20 per cent of emulsifying agent, and substantial proportions respectively of an emulsified alkyd resin and an ionogen.

6. In an electric capacitor having film-forming armatures, an aqueous electrolyte consisting by weight of about 10 to 40 per cent water, about 2 to 20 per cent of an organic compound containing an amine group and substantial proportions respectively of an emulsified alkyd resin and ammonium borate.

JOHN R. T. CRAINE.